United States Patent
Srivastava (10) Patent No.: US 8,867,076 B2
(45) Date of Patent: Oct. 21, 2014

(54) INSTALLING PRINTER APPLICATIONS ON A PRINTER USING MESSAGES

(75) Inventor: Saurabh Srivastava, Bangalore (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 56 days.

(21) Appl. No.: 13/459,361

(22) Filed: Apr. 30, 2012

(65) Prior Publication Data

US 2013/0286416 A1 Oct. 31, 2013

(51) Int. Cl.
*G06F 3/12* (2006.01)

(52) U.S. Cl.
USPC .......................... 358/1.15; 358/1.13; 717/178

(58) Field of Classification Search
CPC ..... G06F 3/1206; G06F 3/126; G06F 3/1285; H04N 1/00212; H04N 1/00244; H04N 1/00347; H04N 1/32128; H04N 2201/001; H04N 2201/0039; H04N 2201/3205
USPC ......... 358/1.14, 1.15, 1.13; 709/217; 717/178
See application file for complete search history.

(56) References Cited

U.S. PATENT DOCUMENTS

| | | | |
|---|---|---|---|
| 6,959,437 B2 | 10/2005 | Schacht et al. | |
| 6,989,910 B2 | 1/2006 | Lomas et al. | |
| 7,146,412 B2 | 12/2006 | Turnbull | |
| 8,264,703 B2* | 9/2012 | Isoda | 358/1.14 |
| 2003/0236871 A1 | 12/2003 | Thurlow | |
| 2004/0249934 A1 | 12/2004 | Anderson et al. | |
| 2007/0088801 A1* | 4/2007 | Levkovitz et al. | 709/217 |
| 2012/0066083 A1* | 3/2012 | Inoue et al. | 717/178 |
| 2012/0194864 A1* | 8/2012 | Oshima et al. | 358/1.15 |

* cited by examiner

*Primary Examiner* — Benny Q Tieu
*Assistant Examiner* — Juan M Guillermety (57) ABSTRACT

Disclosed is a system, apparatus, and method for installing a printer application on a printer. A cloud based server system receives a recommendation message from a source printer over a network connection such as, for instance, the Internet. The recommendation message may contain an email address for a destination printer and a printer application name. The cloud server system may verify that the email address in the request message corresponds to a valid destination printer. The cloud server system may then forward the printer application name to the destination printer where it is processed. A download request to the cloud server system may be generated requesting the specific printer application. The cloud server system may push the requested printer application over the network where it is installed on the destination printer.

15 Claims, 6 Drawing Sheets

INSTALLING PRINTER APPLICATIONS ON A PRINTER USING MESSAGES

BACKGROUND

Printer applications ("print apps") are specialized programs (e.g., software applications) available for use on network (e.g., Internet) connected printers. A printer application may be a shortcut to printing content from an Internet web-site directly from your printer, with no computer involvement required. Printer applications provide direct access to pre-formatted content from various web-sites. There exists a growing library of printer applications that make printing faster, simpler and more useful than ever. For instance, a printer application may allow scanning and saving documents directly to a cloud based Internet storage location.

Printer applications function by pulling content from the Internet (e.g., text, photos, and graphics) into nicely formatted printed pages that can be printed directly from a printer. Printer applications may provide easy access to selected popular and useful content, but do not permit browsing the Internet for content from a printer. There may also be printer applications that support scheduled delivery, which allows for setting up a personal schedule to print content automatically on set days/times.

Installing printer applications on a printer can be a tedious process. Thus, improved systems and methods of installing printer applications on an Internet connected printer may be desirable.

SUMMARY

Disclosed in a first embodiment is a system, apparatus, and method for installing a printer application on a printer. A cloud based server system receives a recommendation message from a source printer over a network connection such as, for instance, the Internet. The recommendation message may contain an email address for a destination printer and a unique print app name associated with a printer application. The cloud server system may verify that the email address in the recommendation message corresponds to a valid destination printer and that the destination printer will accept communications from or on behalf of the source printer. The cloud server system may then forward the print app name in the recommendation message to the destination printer. The destination printer may process the print app name and generate a download request to the cloud server system requesting the specific printer application corresponding to the print app name. The cloud server system may push the requested printer application to the destination printer over the network where it is installed on the destination printer.

In another embodiment, a printer apparatus is disclosed comprising a processing component, a memory coupled with the processing component, and a printer application installer module stored in the memory and executable by the processing component. The printer application installer module may be communicable with a cloud server system over a network. The printer application installer module may create a request message containing a unique print app name and send the request message to the cloud server system. The cloud server system may receive the request message and verify the printer apparatus using the email address that sent the request message. The cloud server system may then identify all the print apps that are specific to the requesting printer apparatus. The cloud server system then pushes print app data for print apps specific to the printer apparatus back to the printer apparatus. The printer application installer module may then search through the print app name data to find a match based on the print app name originally entered in the request. Once a print app name match is determined, the printer apparatus can download the specific print app from the cloud server system and install the print app on the printer apparatus.

DETAILED DESCRIPTION

Presented herein is an approach to install printer applications on an Internet connected printer. Printer applications are specialized programs (e.g., software applications) available for use on network (e.g., Internet) connected printers. A printer application may be a shortcut to printing content from an Internet web-site directly from your printer, with no computer involvement required. Printer applications provide direct access to pre-formatted content from various web-sites. There exists a growing library of printer applications that make printing faster, simpler and more useful than ever. For instance, a printer application may allow scanning and saving documents directly to a cloud based Internet storage location.

Currently, there is no mechanism for installing a printer application on a second printer at the request or recommendation of a first printer. Nor is there a mechanism for keyword searching a library of printer applications so as to download a specific printer application without having to scroll through a non-searchable list.

With respect to having a first printer recommend and initiate the installation of a printer application on a second printer, there is disclosed a system in which the first printer can communicate with an Internet based printer application server system. The first printer can forward a recommendation message to the printer application server system containing an email address for a second printer and the name of a printer application. The printer application server system can verify the existence of the second printer based on the supplied email address and notify the second printer of the printer application recommendation of the first printer. The second printer may check to see that it trusts or accepts the recommendations of the first printer based on the email address of the first printer. If so, the second printer can download the recommended printer application from the printer application server system and install it.

With respect to having a printer download a specific printer application from the printer application server system, the printer may send a request message containing the email address of the printer and the name of a specific printer application to the cloud server system. The cloud server system may receive the request message and verify the printer apparatus using the email address that sent the request message. The cloud server system may then identify all the printer applications that are specific to the requesting printer apparatus. The cloud server system then pushes print app data for printer applications specific to the printer apparatus back to the printer apparatus. The printer application installer module may then search through the print app name data to find a match based on the print app name originally entered in the request message. Once a print app name match is determined, the printer apparatus can request to download the specific printer application from the cloud server system and install the printer application on the printer apparatus. This specific request mechanism avoids having a user browse a list of available printer applications and instead focuses the effort on a specific printer application.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
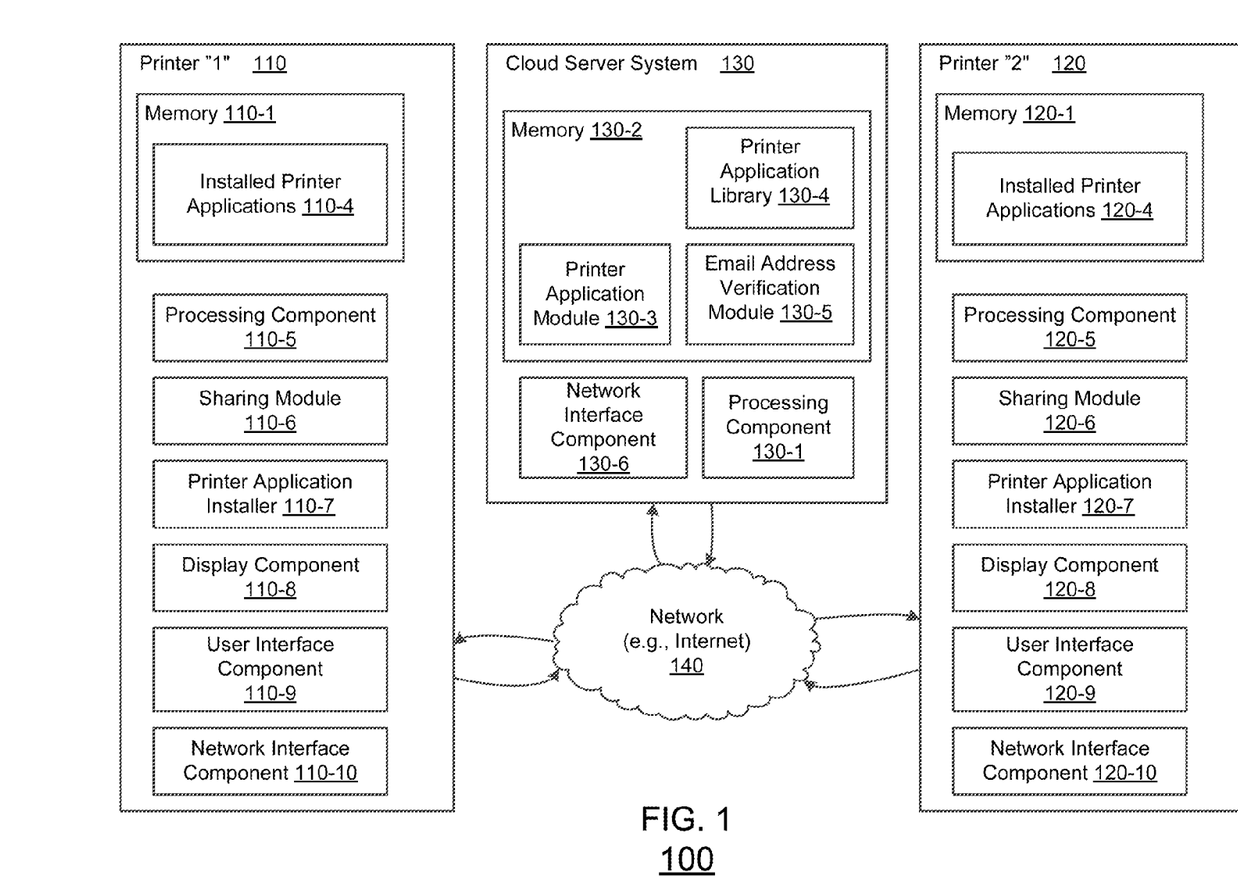
FIG. 1 illustrates one embodiment of a printer application installation system.

FIG. 1 illustrates one embodiment of a printer application installation system 100. A first printer 110 is disclosed and includes multiple components directed toward the installation of printer applications. The actual components that perform the printing functions have not been illustrated herein because this disclosure is focused on printer applications and communications with other printers 120 and a cloud server system 130.

Printer 110 and printer 120 are similar with respect to the components described to implement the embodiments of this disclosure. Thus, the description pertaining to printer 110 applies equally to printer 120 and will not necessarily be repeated herein. That does not mean, however, that printer 110 and printer 120 are identical printers or that they necessarily accommodate the same printer applications—only that they share similar components for implementing the embodiments described.

Printer 110 includes a processing component 110-5 and a memory component 110-1. The memory component 110-1 further includes stored data such as one or more installed printer applications 110-4. The installed printer applications 110-4 may be one or more executable printer applications designed to perform specific functions when executed.

One of the features described herein is the ability of printer 110 to share or recommend a printer application with another printer 120. To that end, a sharing module 110-6 comprises executable software to assist a user in sharing a particular printer application with another printer 120 without having to use a separate computer. Also included is a printer application installer 110-7. The printer application installer 110-7 is a software application that installs printer applications received from the cloud server system 130 via a network 140 such as the Internet.

The network 140 may be a local area network (LAN) or wide area network (WAN) that service a specific group of computers and printers. In such cases, a network server may take the place of the cloud server system described herein. The network server would include similar components and functionality attributable to the cloud server system as described. Thus, a closed group of printers may be able to implement the embodiments described herein by communicating with a network server storing printer applications within the closed network.

A display component 110-8 is disposed somewhere on printer 110 and provides visual feedback to users of the printer 110. The display 110-8 may display various screens under the control of a user interface component 110-9 as executed by the processing component 110-5. The user interface component 110-9 may be responsible for organizing content to be displayed on the display 110-8. The user interface component 110-9 may also be responsible for receiving input from a user. For example, the user interface component 110-9 in conjunction with display 110-8 may guide or assist a user in creating messages to be sent to the cloud server system 130. The input may be in response to one or more of the applications executing on the printer 110.

In addition, the display 110-8 may be a touchscreen display that allows for input to be received directly on the display surface. For example, the printer 110 may display icons indicative of one or more of the printer applications installed on the printer 110. A user may execute one of the displayed printer applications by touching the screen where its icon is displayed. The user interface component 110-9 may interpret this input and cause the printer application to execute. Other examples of user interface actions may include scrolling up/down, scrolling left/right, and zooming. The embodiments are not limited to these examples.

A network interface component 110-10 coupled with the processing component 110-5 may serve as the physical link between the printer 110 and the network (e.g., Internet) 140. The network 140, in turn, may be coupled with the cloud server system 130 as well as other printer(s) 120. The network interface component 110-10 may be responsible for sending data out of and receiving data into the printer 110.

In addition to the Internet Protocol (IP) used to exchange packet data among networked devices, the network interface component 110-10 may also implement the Extensible Messaging and Presence Protocol (XMPP) to package messages and communications between printers 110, 120 and the cloud server system 130. XMPP is a communications protocol for message oriented middleware based on the Extensible Markup Language (XML). The client-server architecture of an XMPP network may be similar to email and may be referred to herein as communicating using email messages. An XMPP server may be resident within the cloud server system 130. The clients (e.g., printers 110, 120 and others) may be registered with the XMPP server within the cloud server system 130 through an email address. Thus, each printer 110, 120 has its own unique email address that is known to the cloud server system 130.

The cloud server system 130 may comprise a processing component 130-1 and memory 130-2. The memory 130-2 may store a printer application module 130-2, printer application library 130-4, and an email address verification module 130-5. A network interface component 130-6 coupled with the processing component 130-1 may serve as a physical link between the cloud server system 130 and the network (e.g., Internet) 140. The network 140, in turn, may be coupled or communicable with printers 110, 120. The network interface component 130-6 may be responsible for sending data out of and receiving data into the cloud server system 130. In addition to the Internet Protocol (IP) used to exchange packet data among networked devices, the network interface component 130-6 may also implement the XMPP Protocol described above.

The printer application module 130-3 may be a software application executing on the cloud server system 130 that is responsible for receiving and responding to recommendation and download request messages pertaining to printer applications. The recommendation messages may be received from source printer(s) and include an identifying email address for destination printer(s). The download request messages may be received from any printer known to the cloud server system.

The printer application library 130-4 may be a repository of printer applications. The printer applications may be identified and referenced by a unique name and may also be associated with a graphical icon and executable code. The applications themselves are executable code that may be copied (e.g., downloaded) to destination printers over the network 140.

The email address verification module 130-5 may comprise an application and a database of printer email addresses. Each printer email address may also be linked with one or more email addresses associated with a white list indicative of other printers it will accept communications from or on behalf of. When a recommendation message is received into the cloud server system 130, the email address verification module 130-5 will parse the message to determine if the destination printer email address is stored by the cloud server system 130. If it is, the email address verification module 130-5 will then parse the sending printer's email address and compare it to the white list to determine if the destination printer will accept communications from or on behalf of the sending printer.

Figure 2:
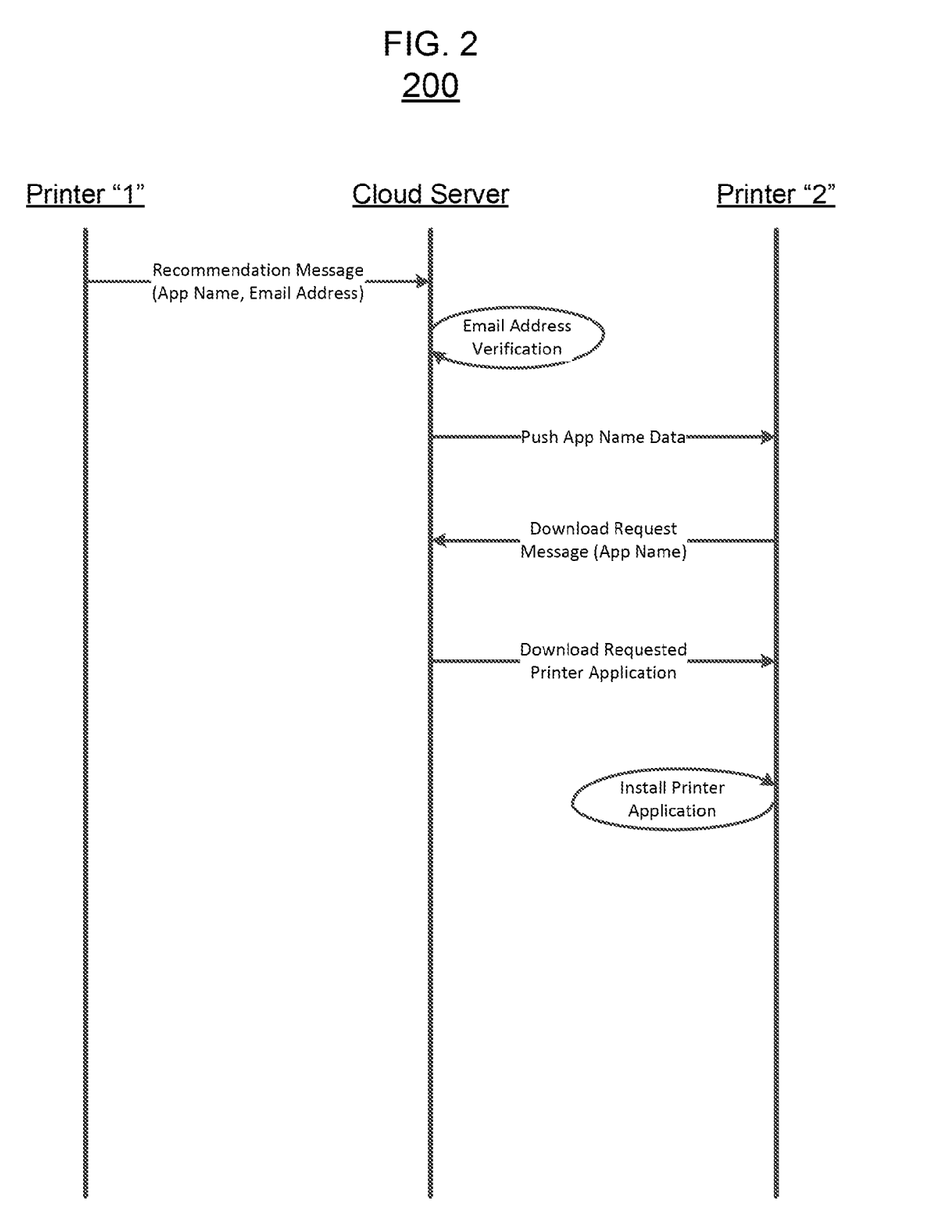
FIG. 2 illustrates an example of a messaging diagram for use with a printer application installation system.

FIG. 2 illustrates an example of a messaging diagram 200 illustrating communications for the printer application installation system 100. In this example, Printer "1" (e.g., source printer 110) would like to recommend a particular printer application that can be installed on Printer "2" (e.g., destination printer 120). Printer "1" and Printer "2" may communicate by proxy through a cloud server (e.g., cloud server system 130).

Printer "1" creates a recommendation message. In its essence, the recommendation message includes an email address for Printer "2" and the name of the printer application. An example recommendation message may appear as "printer1@printappserver.com (printer2@printappserver.com, app_name)". The construct of the request message is exemplary. The embodiments are not limited to this example. Printer "1" sends the recommendation message to the cloud server. The recommendation message may be sent using the XMPP protocol to the cloud server which may be an XMPP server.

The cloud server may parse the recommendation message by extracting the destination printer email address and the application name. The cloud server may verify the existence of the destination printer email address and that the source printer is on a white list of printer email addresses that can initiate printer application communications with the destination printer.

Upon verifying the destination printer email address, the cloud server may then push the printer application name to Printer "2". Printer "2" may then create and send a download request message back to the cloud server. The download request message includes the printer application name. The cloud server may then download the specific printer application file associated with the printer application name to the destination printer.

The printer application file may include an executable file that performs the functionality of the printer application as well as a graphic icon that may be used on the destination printer's display. Upon receipt of the printer application file, Printer "2" may then self-install the printer application and make it available for use. The printer application icon may also be visible on the destination printer's user interface channel bar. The embodiments are not limited to this example.

Figure 3:
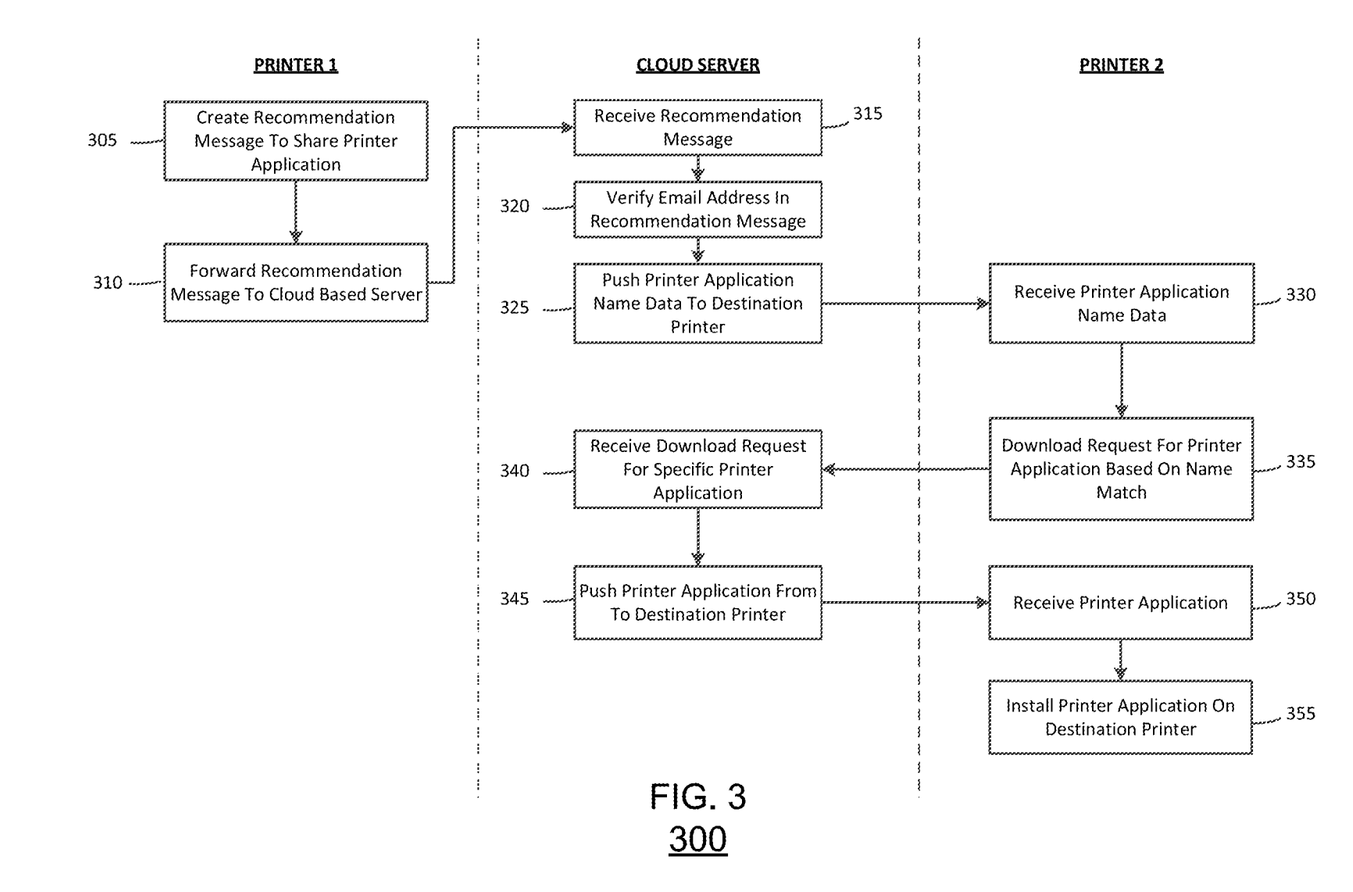
FIG. 3 illustrates one embodiment of a logic flow in which a printer application may be installed on a printer.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation FIG. 3 illustrates one embodiment of a logic flow in which a printer application may be installed on a printer. The logic flow 300 may permit a source printer 110 to recommend a printer application to a destination printer 120 through an intermediary cloud server system 130. The logic flow 300 may be representative of some or all of the operations executed by one or more embodiments described herein.

In the illustrated embodiment shown in FIG. 3, a source printer 110 may initiate a printer application recommendation to a destination printer 120 by having the sharing module 110-6 create a recommendation message at block 305. The recommendation message may include an email address for the destination printer 120 and the recommended printer application name. The recommendation message may be sent to the cloud based cloud server system 130 at block 310 using the network interface component 110-10. The recommendation message may be sent using the XMPP protocol to the cloud server system 130 which may implement an XMPP server. The embodiments are not limited to this example.

The network interface component 130-6 of the cloud server system 130 may receive the recommendation message at block 315 and forward it to the email address verification module 130-5. The email address verification module 130-5 may then verify the destination printer email address in the recommendation message at block 320. For example, the email address verification module 130-5 may parse the recommendation message to extract the destination printer email address and the application name. The email address verification module 130-5 may verify that the destination printer email address is stored in memory 130-2 and that the source printer 110 is on a white list of printer email addresses associated with the destination printer 120. The white list indicates that the source printer 110 can initiate printer application communications with the destination printer 120. The embodiments are not limited to this example.

The printer application module 130-3 may then push the printer application name to the destination printer 120 at block 325. For example, the printer application module 130-3 may encapsulate the printer application name into an XMPP message and push it out to the destination printer 120 using the email address given to the destination printer 120. The embodiments are not limited to this example.

The destination printer 120 may receive the printer application name at block 330. For example, the network interface component 120-10 may receive the XMPP message containing the printer application name and forward it to the sharing module 120-6. The sharing module 120-6 of destination printer 120 may unpack the message to extract the printer application name. The sharing module 120-6 may then create download request message containing the printer application name and forward the message back to the cloud server system 130 at block 335. The embodiments are not limited to this example.

The network interface component 130-6 of the cloud server system 130 may receive the download request message at block 340. The printer application module 130-3 may parse the download request message to obtain the printer application name. The printer application module 130-3 may then attach a copy of the printer application obtained from the printer application library 130-4 to another XMPP message that is sent to the destination printer 120 at block 345. The embodiments are not limited to this example.

The network interface component 120-10 of the destination printer 120 may receive the XMPP message containing the printer application file at block 350. The printer application installer 120-7 may unpack and install the printer application file at block 355. Installation of the printer application file on the destination printer 120 may cause an icon for the printer application to appear on a user interface channel bar of the display 120-8 of the destination printer 120. Selection of this icon by means of the user interface component 120-9 may execute the printer application. The user interface component 120-9 may organize the icon(s) associated with all of the installed printer applications 120-4 stored in memory 120-1 of destination printer 120 and display them on display 120-8. The embodiments are not limited to this example.

Figure 4:
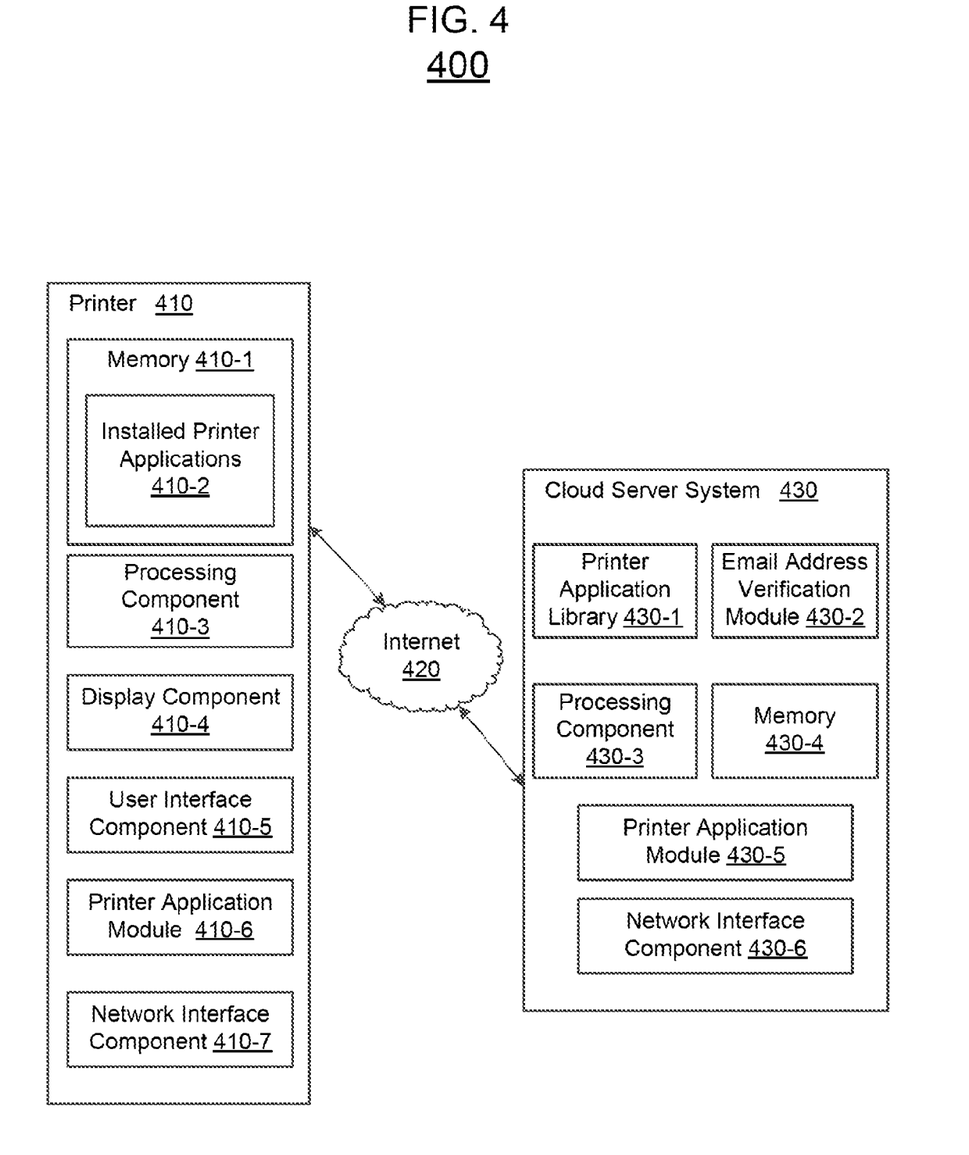
FIG. 4 illustrates another embodiment of a printer application installation system.

FIG. 4 illustrates another embodiment of a printer application installation system 400. Printer 410 includes multiple components directed toward the installation of printer applications. The actual components that perform the printing functions have not been illustrated herein because this disclosure is focused on printer applications and communications with a cloud server system 430.

Printer 410 includes a processing component 410-3 and a memory component 410-1. The memory component 410-1 further includes stored data such as one or more installed printer applications 410-2. The installed printer applications 410-2 may be one or more executable printer applications designed to perform specific functions when executed.

One of the features of the present disclosure is the ability of the printer 410 to obtain a printer application from the cloud server system 430 without having to browse through a list of available printer applications. To that end, a printer application module 410-6 comprises executable software to assist a user in obtaining and installing a particular printer application from the cloud server system 430 without having to use a separate computer. Also included is a printer application module 410-6. The printer application module 410-6 is a software application that installs printer applications received from the cloud server system 130 via a network 420 such as the Internet.

A display component 410-4 is disposed somewhere on printer 110 and provides visual feedback to users of the printer 110. The display 410-4 may display various screens under the control of a user interface component 410-5 as executed by the processing component 410-3. The user interface component 410-5 may be responsible for organizing content to be displayed on the display 410-4. The user interface component 410-5 may also be responsible for receiving input from a user. The input may be in response to one or more of the applications executing on the printer 410.

In addition, the display 410-4 may be a touchscreen display that allows for input to be received directly on the display surface. For example, the printer 410 may display icons indicative of one or more of the printer applications installed on the printer 410. A user may execute one of the displayed printer applications by touching the screen where its icon is displayed. The user interface component 410-5 may interpret this input and cause the printer application to execute. Other examples of user interface actions may include scrolling up/down, scrolling left/right, and zooming. The embodiments are not limited to these examples.

A network interface component 410-7 coupled with the processing component 410-3 may serve as the physical link between the printer 410 and the network (e.g., Internet) 420. The network 420, in turn, may be coupled with the cloud server system 430. The network interface component 410-8 may be responsible for sending data out of and receiving data into the printer 410.

In addition to the Internet Protocol (IP) used to exchange packet data among networked devices, the network interface component 410-7 may also implement the Extensible Messaging and Presence Protocol (XMPP) to package messages and communications between printer 410 and the cloud server system 430. XMPP is a communications protocol for message oriented middleware based on the Extensible Markup Language (XML). The client-server architecture of an XMPP network may be similar to email. An XMPP server may be resident within the cloud server system 430. The clients (e.g., printer 410) may be registered with the XMPP server within the cloud server system 430 through an email address. Thus, the printer 410 has its own unique email address that is known to the cloud server system 430.

The cloud server system 430 may comprise a printer application library 430-1, an email address verification module 430-2, a processing component 430-3, a memory 430-4, a printer application module 430-5 and a network interface component 430-6. The network interface component 430-6 may be coupled with the processing component 430-3 and serve as the physical link between the cloud server system 430 and the network (e.g., Internet) 420. The network 420, in turn, may be coupled with printer 410. The network interface component 430-6 may be responsible for sending data out of and receiving data into the cloud server system 430. In addition to the Internet Protocol (IP) used to exchange packet data among networked devices, the network interface component 430-6 may also implement the XMPP Protocol.

The memory 430-4 may store, among other data, a list of email addresses for printers. A printer's email address that is stored in memory 430-4 may serve as confirmation that a printer 410 is communicable with the cloud server system 430. The printer application module 430-5 may be a software application executing on the cloud server system 430 that is responsible for receiving and responding to XMPP messages from printers pertaining to printer applications.

The printer application library 430-1 may be a repository of printer applications. The printer applications may be identified and referenced by a unique name and may also be associated with a graphical icon. The applications themselves are executable code that may be downloaded to a printer 410 over the network 420 via an attachment to an XMPP message.

Figure 5:
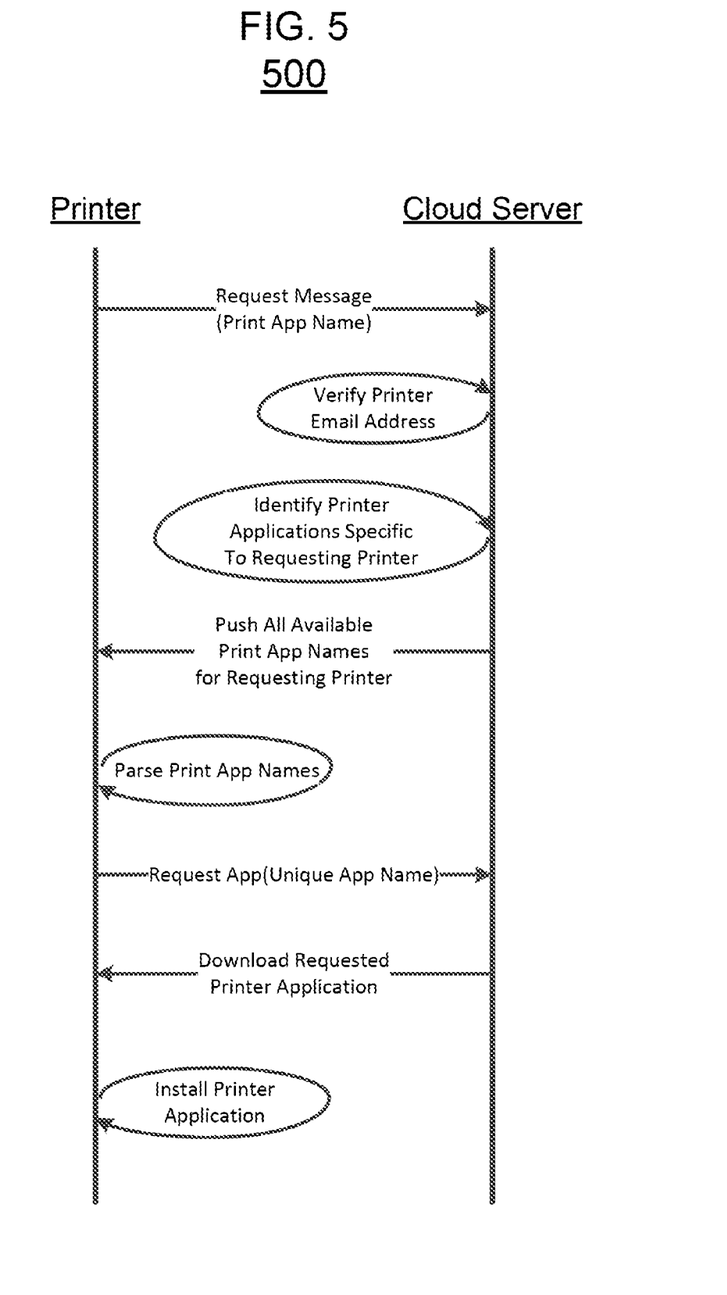
FIG. 5 illustrates another example of a messaging diagram for use with a printer application installation system.

FIG. 5 illustrates another example of a messaging diagram 500 for use with a printer application installation system 400. In this example, the Printer (e.g., printer 410) would like to search for and obtain a particular printer application from a Cloud server (e.g., cloud server system 430).

Printer 410 creates a request message. The request message may include the name of the printer application. An example request message may appear as "printer1@printappserver.com (app_name)". The construct of the request message is exemplary. The embodiments are not limited to this example. Printer 410 sends the request message to the cloud server system 430. The request message may be sent using the XMPP protocol to the cloud server system 430 which may be an XMPP server.

The cloud server system 430 may verify the registration of the printer 410 with the cloud server system 430 based on the email address of the printer 410. Upon verifying the printer email address has been properly registered, the cloud server system 430 may gather information pertaining to printer applications specific to the requesting printer. The cloud server system 430 may then respond to the request message by forwarding the printer application data to the printer 410. Printer 410 may then parse the received printer application data to search for a name match to the printer application name of the original request message. Upon finding a match, printer 410 may create and send a download request message back to the cloud server system 430.

The cloud server system 430 may then push the desired printer application file to printer 410 using an XMPP message. The printer application file may include an executable file that performs the functionality of the printer application as well as a graphic icon that may be used on the printer's display 410-4. Upon receipt of the printer application file via the network interface component 410-7, the printer application module 410-6 may then install the printer application and make it available for use. The embodiments are not limited to this example.

Figure 6:
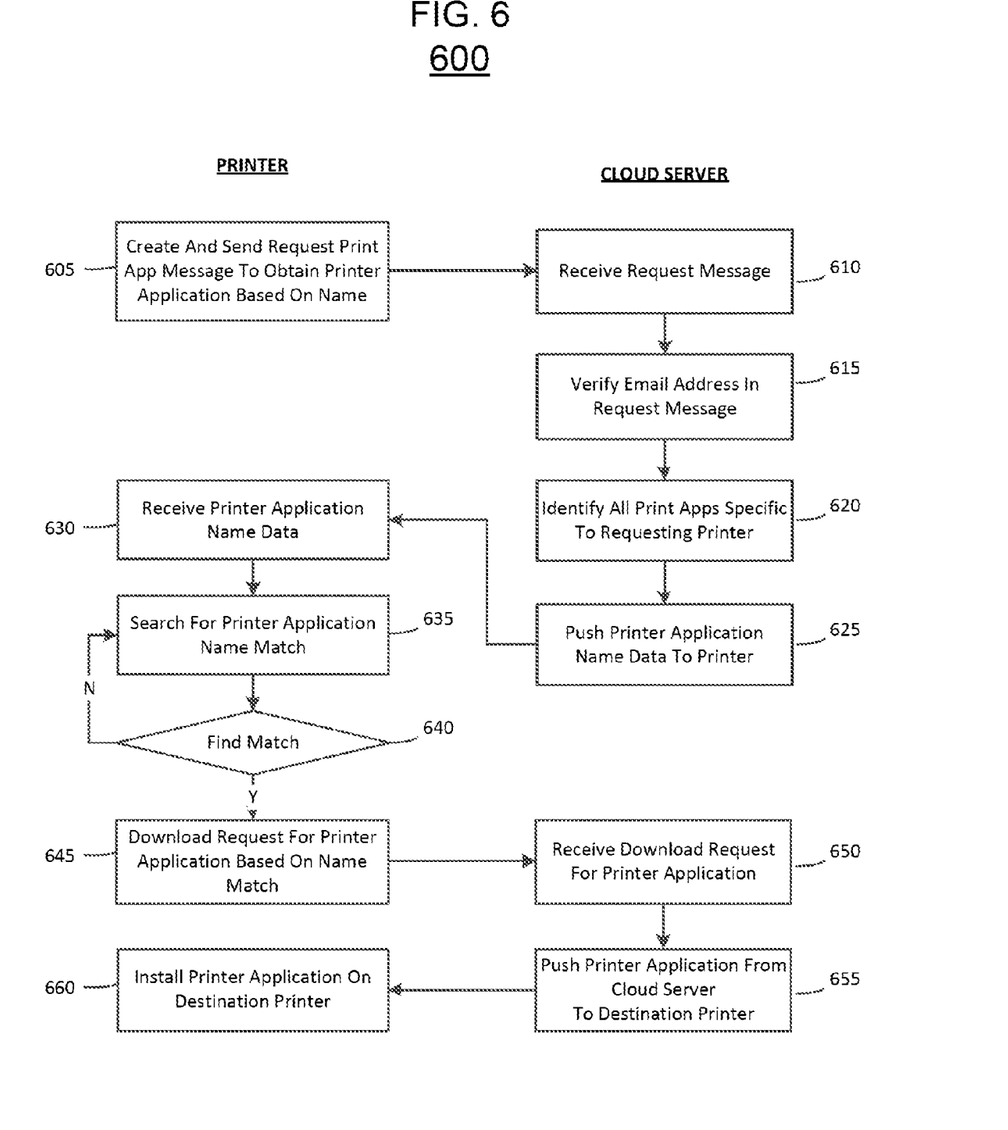
FIG. 6 illustrates another embodiment of a logic flow in which a printer application may be installed on a printer.

FIG. 6 illustrates another embodiment of a logic flow 600 in which a printer application may be installed on a printer 410. The logic flow 600 may permit a printer 410 to obtain and install a printer application from a cloud server system 430. The logic flow 600 may be representative of some or all of the operations executed by one or more embodiments described herein.

In the illustrated embodiment shown in FIG. 6, a printer 110 may create and send a request message at block 605. The request message may include the printer application name to be obtained. The request message may be sent using the XMPP protocol to the cloud server system 430 which may implement an XMPP server. The embodiments are not limited to this example.

The network interface component 430-6 of the cloud server system 430 may receive the request message at block 610. The email address verification module 430-2 of the cloud server system 430 may then verify the email address of the printer 410 associated with the request message at block 615. For example, the email address verification module 430-2 may parse the request message by extracting the sending printer's email address and the application name. The email address verification module 430-2 may verify the registration status of the printer's email address by ensuring the email address matches an email address stored in memory 430-4. The embodiments are not limited to this example.

The printer application module 430-5 of the cloud server system 430 may identify all of the printer applications within printer application library 430-1 that are compatible with the requesting printer at block 620. For example, memory 430-4 may store additional printer data for a printer associated with an email address. The additional information may include a model number for the printer. The model number may then dictate whether a specific printer application is compatible with a specific printer 410. The embodiments are not limited to this example.

The printer application module 430-5 of the cloud server system 430 may push printer application data to the printer 410 at block 625. For example, the printer application module 430-5 may encapsulate the printer application data into an XMPP message and push it out to the printer 410 using the email address given to the printer 410. The embodiments are not limited to this example.

The printer 410 may receive the printer application data at block 630. For example, the network interface component 410-7 may receive and direct the printer application data to the printer application module 410-6 of the printer 410. The printer application module 410-6 may unpack the message and parse the printer application data to find a match to the requested printer application name at block 635. The printer application module 410-6 may iteratively search the printer application data at block 640. If a printer application name match is not found in the first record of the printer application data at block 640, control will return to block 635 to examine the next record of the printer application data. This process is repeated until a printer application name match is found or until all of the records of the printer application data have been searched. The embodiments are not limited to this example.

If a printer application name match is found at block 640, the printer application module 410-6 may create and send, via network interface component 410-7, a download request message to the cloud server 430 at block 645. For example, the download request may include the printer application name that was matched at block 640. The embodiments are not limited to this example.

The network interface component 430-6 of the cloud server system 430 may receive the download request message at block 650. The printer application module 430-5 of the cloud server 430 may then package the requested printer application in another XMPP message, for instance, to return to the printer 410 at block 655

The network interface component 410-7 of the printer 410 receives the message containing the printer application and forwards the printer application to the printer application module 410-6. The printer application module 410-6 may then install the printer application on the printer 410 at block 660. Installation of the printer application file on the printer 410 may cause an icon for the printer application to appear on a user interface channel bar of the display 410-4 of printer 410. Selection of this icon by means of the user interface component 410-5 may execute the printer application. The user interface component 410-5 may organize the icon(s) associated with all of the installed printer applications 410-2 stored in memory 410-1 of printer 410 and display them on display 410-4. The embodiments are not limited to this example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a non-transitory machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method of installing a printer application on a destination printer comprising: receiving a recommendation message from a source printer over a network, the recommendation message containing an email address for a destination printer and a printer application name; verifying the email address in the recommendation message; pushing the printer application name to the destination printer over the network; receiving a download request message from the destination printer, the download request message containing the printer application name; and pushing the printer application corresponding to printer application name to the destination printer over the network.

2. The method of claim 1, wherein the recommendation message and the download request message are received using an extensible messaging and presence protocol (XMPP).

3. The method of claim 1, the verifying the email address in the recommendation message comprising:
   determining whether the email address for the destination printer matches an email address stored in memory;
   determining the email address of the source printer that sent the recommendation message; and
   determining whether the email address for the destination printer has identified the email address of the source printer that sent the recommendation message as a source printer from which it will accept communications.

4. A printer apparatus comprising:
   a processing component;
   a memory coupled with the processing component; and
   a sharing module stored in the memory and executable by the processing component, the sharing module to communicate with a cloud server system over a network via a network interface component, the sharing module to:
      create a recommendation message containing an email address for a destination printer and a printer application name;
      send the recommendation message to the cloud server system; and
      receive a printer application from the cloud server system, the printer application the result of a recommendation message sent from a source printer to the cloud server system in which the recommendation message includes an email address for the printer apparatus.

5. The printer apparatus of claim 4, comprising:
   a printer application installer module stored in the memory and executable by the processing component, the printer application installer module to install the received printer application on the printer apparatus.

6. The printer apparatus of claim 4, the communication between the sharing module and the cloud server system using an extensible messaging and presence protocol (XMPP).

7. The printer apparatus of claim 4, further comprising a display coupled with the processing component.

8. The printer apparatus of claim 7, the display comprising a touchscreen display.

9. A cloud server system comprising:
   a processing component;
   a memory coupled with the processing component;
   a printer application module stored in the memory and executable by the processing component, the printer application module to communicate with source and destination printers over a network, the printer application module to:
      receive a recommendation message from a source printer apparatus containing an email address for a destination printer and a printer application name;
      push printer application data specific to the destination printer to the destination printer over the network;
      receive a download request message from the destination printer, the download request message containing the printer application name; and download the printer application identified in the download request message to the destination printer.

10. The cloud server system of claim 9, further comprising an email verification module stored in the memory and executable by the processing component to verify the validity of the source and destination printers by:
   determining whether the email address for the destination printer matches an email address stored in memory;
   determining the email address of the source printer that sent the recommendation message; and
   determining whether the email address for the destination printer has identified the email address of the source printer that sent the recommendation message as a source printer from which it will accept communications.

11. The cloud server system of claim 9, the communication between the printer application module and the source and destination printer apparatuses using an extensible messaging and presence protocol (XMPP).

12. A printer apparatus comprising:
   a processing component; a memory coupled with the processing component; a printer application installer module stored in the memory and executable by the processing component, and communicable with a cloud server system over a network, the printer application installer module to: create a request message containing a printer identification for the printer apparatus and a printer application name; send the request message to the cloud server system; receive printer application data from the cloud server system in response to the request message and in response to the cloud server system verifying the printer identification for the printer apparatus with a printer identification received from another device; parse the printer application data to find a printer application name matching the printer application name in the request message; send a download request message to the cloud server system for a printer application associated with the matching printer application name; receive the printer application from the cloud server system; and install the received printer application on the printer apparatus.

13. The printer apparatus of claim 12, the communication between the printer application installer module and the cloud server system using an extensible messaging and presence protocol (XMPP).

14. The printer apparatus of claim 12, further comprising a display coupled with the processing component.

15. The printer apparatus of claim 14, the display comprising a touchscreen display.

\* \* \* \* \*